United States Patent
Li et al.

(10) Patent No.: US 12,272,920 B1
(45) Date of Patent: Apr. 8, 2025

(54) BROADBAND LASER SYSTEM ENHANCED IN LATER PART OF MID INFRARED SPECTRUM

(71) Applicant: Beijing University of Technology, Beijing (CN)

(72) Inventors: Pingxue Li, Beijing (CN); Xuan Wang, Beijing (CN); Chuanfei Yao, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 18/973,149

(22) Filed: Dec. 9, 2024

(30) Foreign Application Priority Data

Jan. 9, 2024 (CN) .......................... 202410026458.8

(51) Int. Cl.

| | |
|---|---|
| *H01S 3/108* | (2006.01) |
| *H01S 3/067* | (2006.01) |
| *H01S 3/08* | (2023.01) |
| *H01S 3/0941* | (2006.01) |
| *H01S 3/1115* | (2023.01) |
| *H01S 3/16* | (2006.01) |
| *H01S 3/23* | (2006.01) |

(52) U.S. Cl.
CPC ........ *H01S 3/1115* (2013.01); *H01S 3/06716* (2013.01); *H01S 3/06733* (2013.01); *H01S 3/06791* (2013.01); *H01S 3/08013* (2013.01); *H01S 3/0941* (2013.01); *H01S 3/108* (2013.01); *H01S 3/161* (2013.01); *H01S 3/1616* (2013.01); *H01S 3/2316* (2013.01); *H01S 2302/00* (2013.01)

(58) Field of Classification Search
CPC ............... H01S 3/1115; H01S 3/06716; H01S 3/06733; H01S 3/06791; H01S 3/08013; H01S 3/0941; H01S 3/108; H01S 3/161; H01S 3/1616; H01S 3/2316; H01S 2302/00
See application file for complete search history.

(56) References Cited

U.S. PATENT DOCUMENTS

| | | | | |
|---|---|---|---|---|
| 2012/0294323 | A1* | 11/2012 | Lin ..................... | H01S 3/06725 372/25 |
| 2015/0288133 | A1* | 10/2015 | Salem ................... | G01N 21/45 359/326 |
| 2019/0036292 | A1* | 1/2019 | Sutter ................. | H01S 3/06754 |
| 2020/0041870 | A1* | 2/2020 | Protopopov .......... | H01S 3/0092 |

FOREIGN PATENT DOCUMENTS

CN 110957627 A * 4/2020

* cited by examiner

*Primary Examiner* — Xinning (Tom) Niu
(74) *Attorney, Agent, or Firm* — Bayramoglu Law Offices LLC

(57) ABSTRACT

A broadband laser system enhanced in the later part of mid infrared spectrum is provided, which can obtain a high power and wide spectrum laser output enhanced in the later part of mid infrared spectrum, and has the advantages of full fiber, compact structure and high ratio of power in the later part of mid infrared spectrum. It includes a mode-locked fiber laser, a pre amplifier, an optical fiber stretcher, an amplifier, a main amplifier, a first nonlinear optical fiber, a mid infrared amplifier and a second nonlinear optical fiber, which are connected in sequence, and each of them adopts a water cooling device or a thermo electric cooler, and is connected by optical fiber fusion.

9 Claims, 1 Drawing Sheet

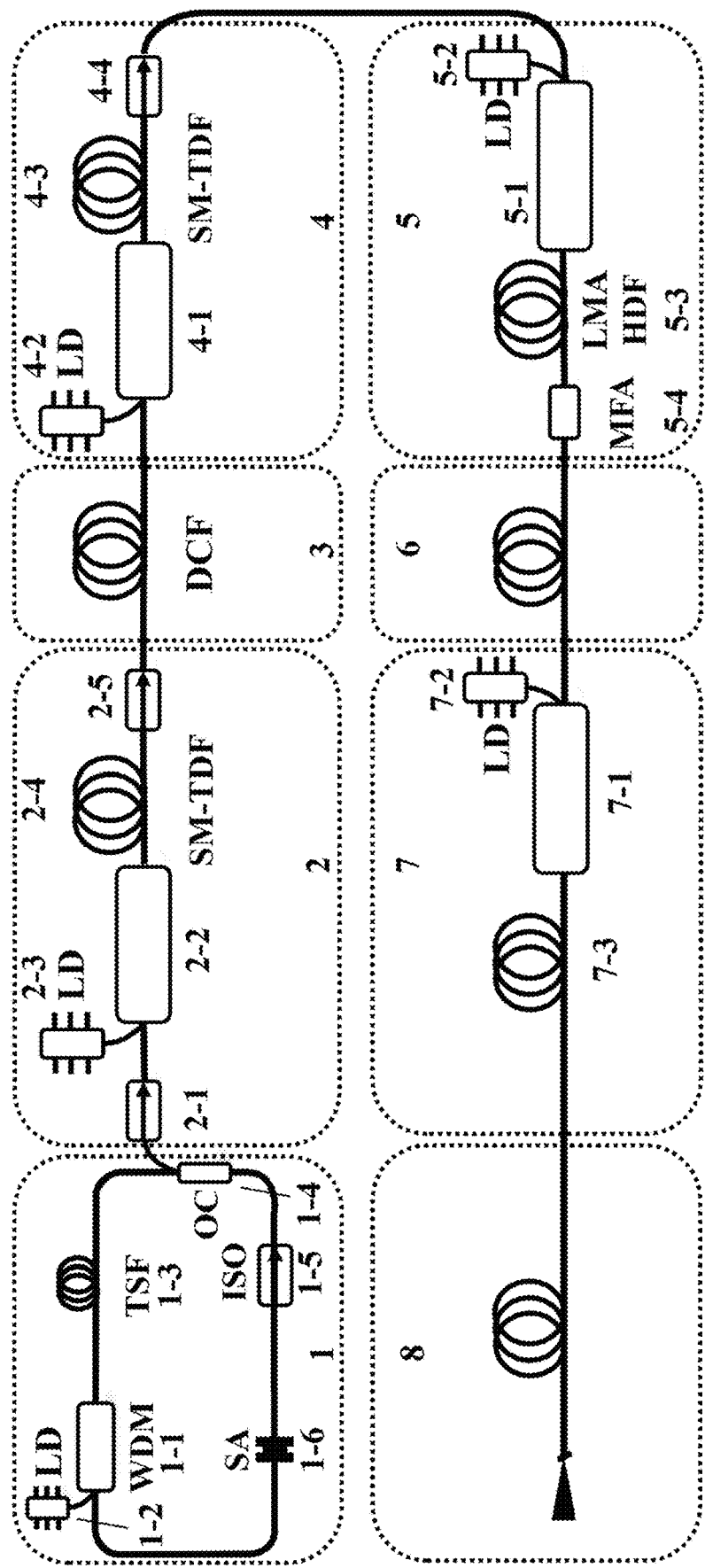

BROADBAND LASER SYSTEM ENHANCED IN LATER PART OF MID INFRARED SPECTRUM

CROSS REFERENCE TO THE RELATED APPLICATIONS

This application is based upon and claims priority to Chinese Patent Application No. 202410026458.8, filed on Jan. 9, 2024, the entire contents of which are incorporated herein by reference.

TECHNICAL FIELD

The invention relates to the technical field of mid infrared laser, in particular to a broadband laser system enhanced in the later part of mid infrared spectrum.

BACKGROUND

The mid infrared 3~5 μm wavelength band covers a high transmittance atmospheric window and a variety of molecular characteristic absorption spectra. It is also a common response spectrum of various detectors in photoelectric countermeasure. Therefore, this band laser has a very wide range of applications in basic scientific research, biomedicine, molecular spectroscopy, photoelectric countermeasure and other fields. Supercontinuum spectrum is a phenomenon that the pulse spectrum is greatly broadened due to the nonlinear effects such as self-phase modulation, modulation instability, cross phase modulation, four wave mixing, stimulated Raman scattering and soliton splitting, as well as the group velocity dispersion when a strong laser pulse is transmitted in a nonlinear optical medium. The supercontinuum light source based on fiber has the characteristics of high efficiency, high beam quality, compact structure, high reliability and high stability. Especially after the appearance of highly nonlinear mid infrared soft glass fibers (such as fluorozirconate fiber, fluoroindium fiber, tellurite fiber and chalcogenide fiber), the supercontinuum light source based on mid infrared fiber has become a main research direction of broadband light source. However, due to the different doping materials of soft glass fiber, the material loss of different kinds of soft glass fiber in different mid infrared wavelength regions has increased sharply, resulting in the spectral range of mid infrared supercontinuum light source is not wide and the ratio of long wavelength spectrum is low. At present, the key difficulties in its development are the expansion of the working band to the long wavelength direction and the increase of the ratio of long wavelength power. Therefore, it is of great significance to further study the spectral expansion and long wave power enhancement of mid infrared broadband laser.

SUMMARY

In order to overcome the defects of the prior art, the technical problem to be solved by the invention is to provide a broadband laser system enhanced in the later part of mid infrared spectrum, which can obtain a high power and wide spectrum laser output enhanced in the later part of mid infrared spectrum, and has the advantages of full fiber, compact structure and high ratio of power in the later part of mid infrared spectrum.

The technical scheme of the invention is as follows.

The broadband laser system enhanced in the later part of mid infrared spectrum comprises a mode-locked fiber laser (1), a pre amplifier (2), an optical fiber stretcher (3), an amplifier (4), a main amplifier (5), a first nonlinear optical fiber (6), a mid infrared amplifier (7) and a second nonlinear optical fiber (8), which are connected in sequence, and each of them adopts a water cooling device or a thermo electric cooler, and is connected by optical fiber fusion.

The mode-locked fiber laser generates a mode-locked pulse laser at the wavelength of 2 μm.

The pre amplifier pre amplifies the power of the mode-locked pulse laser.

The optical fiber stretcher stretches the pre amplified mode-locked pulse laser pulse.

The amplifier amplifies the power of the pulse laser after pulse broadening and expands the spectrum to 2.5 μm wavelength band.

The main amplifier further improves the output power of the pulse laser, expands the spectrum to 3 μm wavelength band, and increases the pulse energy of 2.1 μm later wavelength band.

The first nonlinear optical fiber extends the spectrum to 3.5 μm wavelength band.

The mid infrared amplifier amplifies the power of the pulse in the 3.5 μm wavelength band, improves the pulse energy of the 3.5 μm later wavelength band, and expands the spectrum to 4 μm wavelength band.

The second nonlinear optical fiber expands the spectrum to more than 5 μm wavelength band to obtain a mid infrared broadband laser source enhanced in the 3.5 μm later wavelength band.

In terms of engineering application, the invention realizes a whole fiber structure of the system through fiber fusion, and each part adopts a water cooling device or a thermo electric cooler, so that the mid infrared wide spectrum fiber laser system has the advantages of compact structure, high integration, good stability and high conversion efficiency, is insensitive to interference factors such as vibration in the working environment, greatly improves the stability and reliability of the laser operation, and is suitable for industrial mass production. In terms of technical advantages, a gain control technology is adopted to improve the pulse energy in the later band of the mid infrared spectrum, which effectively improves the power ratio in the later band of the mid infrared spectrum. Because the spectral transmission window of the cascaded pump spectrum is widened in turn, and the mid infrared soft glass fibers whose nonlinear coefficient increase in turn are broaden on the spectrum, the supercontinuum spectral range is effectively expanded, and finally the high-power wide spectral laser output with enhanced mid infrared later spectral band is obtained, which is beneficial to the applications in fields of gas detection, biomedicine and military.

BRIEF DESCRIPTION OF THE DRAWINGS

The FIGURE is a schematic diagram showing the broadband laser system enhanced in the later part of mid infrared spectrum according to the present invention.

DETAILED DESCRIPTION OF THE EMBODIMENTS

In order to enable those in the art to better understand the scheme of the invention, the technical scheme in embodiments of the invention will be clearly and completely described below in combination with the attached drawings in the embodiments of the invention. Obviously, the described embodiments are only part of the embodiments of the invention, not all of them. Based on the embodiments of the invention, all other embodiments obtained by those skilled in the art without creative work should be within the scope of the invention.

It should be noted that the term "including" and any variation in the specification and claims of the invention and the above drawings are not intended to cover exclusive inclusion. For example, a process, method, means, product or device that contains a series of steps or units need not be limited to those steps or units clearly listed, but may include other steps or units that are not clearly listed or inherent to the process, method, product or device.

As shown in the FIGURE, the broadband laser system enhanced in the later part of mid infrared spectrum comprises a mode-locked fiber laser 1, a pre amplifier 2, an optical fiber stretcher 3, an amplifier 4, a main amplifier 5, a first nonlinear optical fiber 6, a mid infrared amplifier 7 and a second nonlinear optical fiber 8, which are connected in sequence, and each of them adopts a water cooling device or a thermo electric cooler (TEC), and is connected by optical fiber fusion.

The mode-locked fiber laser generates a mode-locked pulse laser at the wavelength of 2 μm.

The pre amplifier pre amplifies the power of the mode-locked pulse laser.

The optical fiber stretcher stretches the pre amplified mode-locked pulse laser pulse.

The amplifier amplifies the power of the pulse laser after pulse broadening and expands the spectrum to 2.5 μm wavelength band.

The main amplifier further improves the output power of the pulse laser, expands the spectrum to 3 μm wavelength band, and increases the pulse energy of 2.1 μm later wavelength band.

The first nonlinear optical fiber extends the spectrum to 3.5 μm wavelength band.

The mid infrared amplifier amplifies the power of the pulse in the 3.5 μm wavelength band, improves the pulse energy of the 3.5 μm later wavelength band, and expands the spectrum to 4 μm wavelength band.

The second nonlinear optical fiber expands the spectrum to more than 5 μm wavelength band to obtain a mid infrared broadband laser source enhanced in the 3.5 μm later wavelength band.

In terms of engineering application, the invention realizes a whole fiber structure of the system through fiber fusion, and each part adopts a water cooling device or a thermo electric cooler, so that the mid infrared wide spectrum fiber laser system has the advantages of compact structure, high integration, good stability and high conversion efficiency, is insensitive to interference factors such as vibration in the working environment, greatly improves the stability and reliability of the laser operation, and is suitable for industrial mass production. In terms of technical advantages, a gain control technology is adopted to improve the pulse energy in the later band of the mid infrared spectrum, which effectively improves the power ratio in the later band of the mid infrared spectrum. Because the spectral transmission window of the cascaded pump spectrum is widened in turn, and the mid infrared soft glass fibers whose nonlinear coefficient increase in turn are broaden on the spectrum, the supercontinuum spectral range is effectively expanded, and finally the high-power wide spectral laser output with enhanced mid infrared later spectral band is obtained, which is beneficial to the applications in fields of gas detection, biomedicine and military.

Preferably, the mode-locked fiber laser comprises a wavelength division multiplexer 1-1, a 1570 nm single-mode semiconductor laser 1-2, a single-mode thulium doped fiber 1-3, a fiber coupling output 1-4, a first fiber isolator 1-5, and a saturable absorber 1-6, which are sequentially connected by a single-mode fiber to form a ring cavity structure. The above components are connected by optical fiber fusion.

Preferably, the 1570 nm single-mode semiconductor laser provides pump light, which is input by a wavelength division multiplexer and pumped into a single-mode thulium doped fiber. The saturable absorber acts as an optical switch, and the fiber isolator maintains the transmission direction of the light. When a gain in the cavity is more than a loss, the phase relationship between many longitudinal modes is locked, forming a 2 μm wavelength band mode-locked pulse laser that oscillates in the cavity. The 2 μm band mode-locked pulse laser is transmitted to the pre amplifier by the output end of the fiber coupling output.

Preferably, the pre amplifier comprises a second optical fiber isolator 2-1, a first optical fiber combiner 2-2, a first 793 nm semiconductor laser 2-3, a single-mode double clad thulium doped fiber 2-4 and a third optical fiber isolator 2-5. The optical fiber isolators prevent the subsequent feedback light from returning to the whole fiber laser oscillator. The first 793 nm semiconductor laser provides pump light. The optical fiber combiner couples the pump light and the mode-locked pulse laser into a single-mode double clad thulium doped fiber. The single-mode double clad thulium doped fiber provides a gain medium for the mode-locked pulse laser under the pump of the pump light to realize the pre amplification of the mode-locked pulse power. Then the pre amplified mode-locked pulse laser enters the optical fiber stretcher through the optical fiber isolator, and the optical fiber isolator isolates the feedback light formed by the subsequent optical path. The above components are connected by optical fiber fusion.

Preferably, the optical fiber stretcher is arranged between the pre amplifier and the amplifier, and the optical fiber stretcher provides positive dispersion to widen a pulse width.

Preferably, the amplifier comprises a second fiber combiner 4-1, a second 793 nm semiconductor laser 4-2, a single-mode double clad thulium doped fiber 4-3 and a fourth fiber isolator 4-4. The second 793 nm semiconductor laser provides pump light for the single-mode double clad thulium doped fiber by the fiber combiner, and the fiber isolator isolates the feedback light formed by the subsequent optical path. The above components are connected by optical fiber fusion.

Preferably, the main amplifier comprises a third fiber combiner 5-1, a first fiber laser 5-2, a large mode area holmium doped fiber 5-3, and a mode field adapter 5-4. The first fiber laser is a 1125 nm or 1950 nm semiconductor laser, which provides pump light for the large mode area holmium doped fiber by the fiber combiner. The mode field adapter connects the large mode area fiber and a single-mode fiber to match the first nonlinear optical fiber. The above components are connected by optical fiber fusion.

Preferably, the first nonlinear optical fiber extends the spectrum generated by the main amplifier to the 3.5 μm wavelength band, and the first nonlinear optical fiber is a germanate fiber, a fluoride fiber or a tellurite fiber. The first nonlinear optical fiber and mode field adapter are connected by optical fiber fusion.

Preferably, the mid infrared amplifier comprises a mid infrared fiber combiner 7-1, a second fiber laser 7-2, and a holmium doped mid infrared gain optical fiber 7-3. The mid infrared fiber combiner couples the pump light into the mid infrared gain fiber by the mean of a pump fiber winding or a fiber taper mode. The second fiber laser is a 1125 nm or 1950 nm semiconductor laser. The holmium doped mid infrared gain optical fiber is a holmium fluorozirconate fiber, a holmium fluoroindium fiber, or a holmium fluorotellurite fiber. The holmium doped mid infrared gain optical fiber 7-3 amplifies the power of the laser output from the first nonlinear optical fiber by adopt of the holmium ion gain at 3.5 μm, improves the pulse energy of 3.5 μm later wavelength band, and expands the spectrum to 4 μm wavelength band. Alternatively, the mid infrared amplifier comprises a mid infrared fiber combiner 7-1, a 1976 nm fiber laser, a 976 nm semiconductor laser, and an erbium doped mid infrared gain fiber. The 1976 nm fiber laser is core pumped, and the 976 nm semiconductor laser is cladding pumped. The erbium doped mid infrared gain fiber is an erbium doped fluorozirconate fiber, an erbium-doped indium fluoride fiber, or an erbium-doped fluorotellurite fiber. The erbium doped mid infrared gain fiber amplifies the power of the laser output from the first nonlinear optical fiber by adopt of the gain of erbium ions at 3.5 μm, improves the pulse energy of 3.5 μm later wavelength band, and expands the spectrum to 4 μm wavelength band.

Preferably, the second nonlinear optical fiber is an arsenic sulfide optical fiber or an arsenic selenide optical fiber, extending the spectrum to more than 5 μm wavelength band. The second nonlinear optical fiber and holmium doped mid infrared gain optical fiber are connected by optical fiber fusion, and the optical fiber output end of the second nonlinear optical fiber is cut at an angle of 15° to prevent Fresnel reflection.

The invention will be further described in detail below in combination with the accompanying drawings.

The FIGURE is a schematic diagram showing the broadband laser system enhanced in the later part of mid infrared spectrum according to the present invention. The broadband laser system enhanced in the later part of mid infrared spectrum comprises a mode-locked fiber laser 1, a pre amplifier 2, an optical fiber stretcher 3, an amplifier 4, a main amplifier 5, a first nonlinear optical fiber 6, a mid infrared amplifier 7 and a second nonlinear optical fiber 8.

The mode-locked fiber laser 1 generates a mode-locked pulse laser at the wavelength of 2 μm.

The pre amplifier 2 pre amplifies the power of the mode-locked pulse laser.

The optical fiber stretcher 3 stretches the pre amplified mode-locked pulse laser pulse.

The amplifier 4 amplifies the power of the pulse laser after pulse broadening and expands the spectrum to 2.5 μm wavelength band.

The main amplifier 5 further improves the output power of the pulse laser, expands the spectrum to 3 μm wavelength band, and increases the pulse energy of 2.1 μm later wavelength band.

The first nonlinear optical fiber 6 extends the spectrum to 3.5 μm wavelength band.

The mid infrared amplifier 7 amplifies the power of the pulse in the 3.5 μm wavelength band, improves the pulse energy of the 3.5 μm later wavelength band, and expands the spectrum to 4 μm wavelength band.

The second nonlinear optical fiber 8 expands the spectrum to more than 5 μm wavelength band to obtain a mid infrared broadband laser source enhanced in the 3.5 μm later wavelength band.

The mode-locked fiber laser 1 comprises the wavelength division multiplexer 1-1, the 1570 nm single-mode semiconductor laser 1-2, the single-mode thulium doped fiber 1-3, the fiber coupling output 1-4, the first fiber isolator 1-5, and the saturable absorber 1-6, which are sequentially connected by a single-mode fiber to form a ring cavity structure. The above components are connected by optical fiber fusion. The 1570 nm single-mode semiconductor laser 1-2 is adopted to provide pump light. The pump light is input by the wavelength division multiplexer 1-1 and pumped into the single-mode thulium doped fiber 1-3. The saturable absorber 1-6 acts as an optical switch. The first fiber isolator 1-5 is adopted to maintain the transmission direction of light. When the gain in the cavity is more than the loss, the phase relationship between many longitudinal modes is locked, forming a 2 μm wavelength band mode-locked pulse laser that oscillates in the cavity. The 2 μm wavelength band mode-locked pulse laser is transmitted to the pre amplifier 2 by the output end of the fiber coupling output 1-4.

It can be seen that the connection relationship and working principle of the optical components of the mode-locked fiber laser 1 are as follows. The wavelength division multiplexer 1-1, the single-mode thulium doped fiber 1-3, the fiber coupling output 1-4, the first fiber isolator 1-5, the saturable absorber 1-6, and the 1570 nm single-mode semiconductor laser 1-2 connected with the wavelength division multiplexer 1-2 by the fiber are set along the optical path. In the ring cavity, the 1570 nm single-mode semiconductor laser 1-2 pumps the single-mode thulium doped fiber 1-3 by the wavelength division multiplexer 1-1 coupling into the cavity in a method of fiber core pumping. The saturable absorber 1-6 acts as an optical switch. The stable mode-locked laser pulse is generated by locking the longitudinal mode. The fiber isolator 1-7 plays a role of fixing the transmission direction. The fiber coupling output 1-4 keeps a part of the signal light in a resonant cavity and continues to oscillate, and the other part of the signal light is output to the next stage. The packaging method adopts a whole fiber packaging method, which is feasible in an experiment.

It should be noted that the saturable absorber of the mode-locked optical fiber laser can be carbon nanotubes, semiconductor saturable absorption mirrors, molybdenum disulfide, etc. The length of the single-mode thulium doped fiber and the beam splitting ratio of the optical fiber coupling output can be adjusted according to the actual case, the pulse characteristics of the seed laser and pump power, etc. Further, the mode-locked optical fiber laser can be a linear cavity structure in addition to a ring cavity structure. The center wavelength of the laser generated by the mode-locked optical fiber laser is 2 μm.

The pre amplifier 2 comprises the second optical fiber isolator 2-1, the first optical fiber combiner 2-2, the first 793 nm semiconductor laser 2-3, the single-mode double clad thulium doped fiber 2-4 and the third optical fiber isolator 2-5. The second optical fiber isolator 2-1 prevents the subsequent feedback light from returning to the whole fiber laser 1. The first 793 nm semiconductor laser 2-3 provides pump light for the gain fiber. The first optical fiber combiner 2-2 couples the pump light and the mode-locked pulse laser into the single-mode double clad thulium doped fiber 2-4. The single-mode double clad thulium doped fiber 2-4 provides a gain medium for the mode-locked pulse laser under the pump of the pump light to realize the pre amplification of the mode-locked pulse power. Then the pre amplified mode-locked pulse laser enters the optical fiber stretcher 3 by the third optical fiber isolator 2-5, and the third optical fiber isolator 2-5 isolates the feedback light formed by the subsequent optical path. The above components are connected by optical fiber fusion.

The optical fiber stretcher 3 is arranged between the pre amplifier 2 and the amplifier 4, and the optical fiber stretcher 3 provides positive dispersion to widen a pulse width in 2 μm wavelength band.

The amplifier 4 comprises the second fiber combiner 4-1, the second 793 nm semiconductor laser 4-2, the single-mode double clad thulium doped fiber 4-3 and the fourth fiber isolator 4-4. The second 793 nm semiconductor laser 4-2 provides pump light for the single-mode double clad thulium doped fiber 4-3 by the second fiber combiner 4-1 so as to improve the power of the laser pulse after pulse broadening. A long wave spectral edge covering 2.5 μm wavelength laser is output after the amplifier 4, and the fourth fiber isolator 4-4 isolates the feedback light formed by the subsequent optical path. The above components are connected by optical fiber fusion.

The main amplifier 5 comprises the third fiber combiner 5-1, the first fiber laser 5-2, the large mode area holmium doped fiber 5-3, and the mode field adapter 5-4. The first fiber laser is a 1125 nm or 1950 nm semiconductor laser, which provides pump light for the large mode area holmium doped fiber 5-3 by the third fiber combiner 5-1, so as to further amplify the power of the laser pulse. The advantage of using the holmium doped fiber amplifier instead of the thulium doped fiber amplifier here is that the emission spectrum peak of the holmium doped fiber is closer to the mid infrared long wave region than that of the thulium doped fiber, and the energy of soliton pulse shifted to the gain bandwidth of holmium ion is increased by using $^5I_7 \rightarrow ^5I_8$ energy level transition (erbium ion corresponds to $^4F_{9/2} \rightarrow ^4I_{9/2}$ energy level transition), and the pulse is further shifted to the long wave frequency under an effect of soliton self frequency shift. Therefore, the pulse energy in the long wave band (2.1 μm later) can be effectively improved by using the holmium doped fiber amplifier and the gain control technology. The mode field adapter 5-4 connects the large mode area fiber and the single-mode fiber to match the first nonlinear optical fiber 6. The above components are connected by optical fiber fusion.

Therefore, the working principle of the pump light source of the broadband laser system enhanced in the later part of mid infrared spectrum according to the present invention based on the gain control technology is as follows. The mode-locked fiber laser 1 is adopted to generate a stable mode-locked pulse laser, the pre amplifier 2 is adopted to pre amplify the seed laser and output the pre amplified laser to the optical fiber stretcher 3, the optical fiber stretcher 3 is adopted to pulse widen the pre amplified laser pulse to prevent the device from being damaged due to the high peak power of the pulse in the subsequent amplification process, the amplifier 4 is adopted to amplify the laser after pulse broadening, the main amplifier 5 is adopted to further enhance the laser power and the laser pulse energy after 2.1 μm. A long wave spectral edge covering 3 μm wavelength laser is output after the main amplifier 5, which is adopted as the pump light source of the first nonlinear optical fiber 6.

The first nonlinear optical fiber 6 is a mid infrared fiber with a high nonlinear coefficient and a wide infrared transmission window. The first nonlinear optical fiber 6 is a germanate fiber, a fluoride fiber or a tellurite fiber. Under the action of a nonlinear effect such as a self phase modulation, a modulation instability and a soliton self frequency shift, the first nonlinear optical fiber 6 expands the spectrum generated by the main amplifier 5 to 3.5 μm wavelength band. The first nonlinear optical fiber 6 and mode field adapter 5-5 are connected by optical fiber fusion.

The mid infrared amplifier 7 comprises the mid infrared fiber combiner 7-1, the second fiber laser 7-2, and the holmium doped mid infrared gain optical fiber 7-3. The mid infrared fiber combiner 7-1 couples the pump light into the mid infrared gain fiber by the mean of a pump fiber winding or a fiber taper mode. The second fiber laser is a 1125 nm or 1950 nm semiconductor laser. The holmium doped mid infrared gain optical fiber 7-3 is a holmium doped fluorozirconate fiber, a holmium doped indium fluoride fiber or a holmium doped fluorotellurite fiber. The holmium doped mid infrared gain optical fiber 7-3 amplifies the power of the laser output from the first nonlinear optical fiber 6 by the holmium ion gain at 3.5 μm, so that more soliton pulses shift frequency to the long wave. After the frequency is shifted to the $Ho^{3+}$ gain bandwidth, the pulses continue to shift and amplify in the holmium doped mid infrared gain optical fiber, so that the pump laser entering the second nonlinear optical fiber 8 can obtain higher pulse energy in 3.5 μm later wavelength band. At the same time, the spectrum is expanded to 4 μm wavelength band by a nonlinear effect of pulse in the fiber.

The second nonlinear optical fiber 8 is an arsenic sulfide optical fiber or an arsenic selenide optical fiber with low dispersion value and zero dispersion wavelength at 3~3.5 μm, which has a higher nonlinear coefficient and a wider infrared transmission window than the first nonlinear optical fiber 6, and by nonlinear effects such as self phase modulation, modulation instability, soliton self frequency shift, etc., the second nonlinear optical fiber 8 extends the spectral long wave edge to more than 5 μm. The second nonlinear optical fiber 8 and holmium doped mid infrared gain optical fiber 7-3 are connected by optical fiber fusion, and the optical fiber output end of the second nonlinear optical fiber 8 is cut at an angle of 15° to prevent Fresnel reflection.

Therefore, the working principle of the spectral broadening part of the broadband laser system enhanced in the later part of mid infrared spectrum according to the present invention based on the gain control technology is as follows.

The gain regulation is reflected in two aspects. Firstly, the holmium doped fiber amplifier instead of conventional thulium doped fiber amplifier is adopted, which is conducive to the improvement of pulse energy in 2.1 μm later wavelength band. Here is the gain regulation of the pump light source, so that the pump laser can first obtain sub pulses with high peak power in the long wave, which is conducive to the expansion of the later spectrum and the increase of the power ratio in the later spectrum. Secondly, it is the mid infrared amplifier, which is adopted to amplify the laser in 3.5 μm later wavelength band. At the same time, the gain and nonlinear effect of the holmium doped mid infrared gain optical fiber 7-3 are adopted to make the laser pulse achieve the effect of amplification and frequency shift at the same time, which effectively improves the spectral power ratio of 3.5 μm later wavelength band.

Firstly, the first nonlinear optical fiber 6 is pumped by a 3 μm high power broadband laser generated from the pump source of the broadband laser system enhanced in the later part of mid infrared spectrum according to the present invention based on the gain control technology, and a high-power broadband laser with a spectral long wavelength edge covering the 3.5 μm wavelength band is obtained. Secondly, the laser enters the mid infrared amplifier 7. The gain provided by holmium ion is adopted to improve the pulse energy of the long wavelength spectrum. At the same time, the wide infrared transmission window of the mid infrared fiber is adopted to obtain a high-power broadband laser with a spectral long wavelength edge covering the 4 μm wavelength band. Finally, it enters the second nonlinear optical fiber 8 for nonlinear spectral broadening. The pump light is pumped near the abnormal dispersion of the nonlinear optical fiber based on the low dispersion value of the second nonlinear optical fiber 8 and the zero dispersion wavelength at 3~3.5 μm. Due to the dispersion and nonlinearity in the nonlinear optical fiber, the pulse generates self phase modulation, modulation instability, soliton self frequency shift, dispersion wave and other nonlinear effects in the nonlinear optical fiber, the pulse frequency shifts further to the direction of the long wave in the second nonlinear optical fiber 8. Finally, a high-power broadband spectral supercontinuum laser with enhanced spectral power in a later band of the spectral long wave edge covering 5 μm wavelength band is obtained.

To sum up, the invention adopts the gain control technology and cascade pump technology to improve the soliton pulse energy of the spectral long wave by the gain provided by the thulium doped fiber and holmium doped fiber, expands the supercontinuum spectral range by the cascaded nonlinear coefficient and the medium infrared nonlinear optical fiber whose transmission window range increases in turn, and adopts the pump light with high pulse energy in the long wave to pump in the abnormal dispersion region of the chalcogenide fiber with high nonlinear coefficient and zero dispersion wavelength at 3~3.5 μm, so as to obtain the high-power and wide spectrum mid infrared laser output with enhanced power in a later band of the spectral long wave edge covering 5 μm wavelength band. The invention adopts a whole fiber structure, so that the laser has the advantages of compact structure, high integration, good stability and high conversion efficiency, and can obtain the high-power and wide spectrum mid infrared laser with enhanced power in a later band.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A broadband laser system enhanced in a later part of mid infrared spectrum, comprising a mode-locked fiber laser, a pre amplifier, an optical fiber stretcher, an amplifier, a main amplifier, a first nonlinear optical fiber, a mid infrared amplifier, and a second nonlinear optical fiber, wherein the mode-locked fiber laser, the pre amplifier, the optical fiber stretcher, the amplifier, the main amplifier, the first nonlinear optical fiber, the mid infrared amplifier, and the second nonlinear optical fiber are connected in sequence, and each of the mode-locked fiber laser, the pre amplifier, the optical fiber stretcher, the amplifier, the main amplifier, the first nonlinear optical fiber, the mid infrared amplifier, and the second nonlinear optical fiber adopts a water cooling device or a thermo electric cooler, and is connected by optical fiber fusion, the mode-locked fiber laser generates a mode-locked pulse laser at a wavelength of 2 μm, the pre amplifier pre amplifies power of the mode-locked pulse laser to obtain a pre amplified mode-locked pulse laser, the optical fiber stretcher stretches the pre amplified mode-locked pulse laser, the amplifier amplifies power of the pre amplified mode-locked pulse laser after pulse broadening to obtain output power of the pre amplified mode-locked pulse laser and expands spectrum to 2.5 μm wavelength band, the main amplifier further improves output power of the pre amplified mode-locked pulse laser, expands the spectrum to 3 μm wavelength band, and increases pulse energy of 2.1 μm later wavelength band, the first nonlinear optical fiber extends the spectrum to 3.5 μm wavelength band, the mid infrared amplifier amplifies power of the pre amplified mode-locked pulse laser in the 3.5 μm wavelength band, improves pulse energy of 3.5 μm later wavelength band, and expands the spectrum to 4 μm wavelength band, and the second nonlinear optical fiber expands the spectrum to more than 5 μm wavelength band to obtain a mid infrared broadband laser source enhanced in the 3.5 μm later wavelength band, wherein the main amplifier comprises a third fiber combiner, a first fiber laser, a large mode area holmium doped fiber, and a mode field adapter, the first fiber laser is a 1125 nm or 1950 nm semiconductor laser, wherein the 1125 nm or 1950 nm semiconductor laser provides a first pump light for the large mode area holmium doped fiber by the third fiber combiner, the mode field adapter connects the large mode area holmium doped fiber and a single-mode fiber to match the first nonlinear optical fiber.

2. The broadband laser system enhanced in the later part of the mid infrared spectrum according to claim 1, wherein the mode-locked fiber laser comprises a wavelength division multiplexer, a 1570 nm single-mode semiconductor laser, a single-mode thulium doped fiber, a fiber coupling output, a first fiber isolator, and a saturable absorber, wherein the wavelength division multiplexer, the 1570 nm single-mode semiconductor laser, the single-mode thulium doped fiber, the fiber coupling output, the first fiber isolator, and the saturable absorber are sequentially connected by the single-mode fiber to form a ring cavity structure, and the 1570 nm single-mode semiconductor laser, the wavelength division multiplexer, the single-mode thulium doped fiber, the fiber coupling output, the first fiber isolator, and the saturable absorber are connected by the optical fiber fusion in sequence.

3. The broadband laser system enhanced in the later part of the mid infrared spectrum according to claim 2, wherein the 1570 nm single-mode semiconductor laser provides a second pump light, the second pump light is input by the wavelength division multiplexer and pumped into the single-mode thulium doped fiber, the saturable absorber acts as an optical switch, the first fiber isolator maintains a transmission direction of the second pump light, when a gain in the ring cavity structure is more than a loss, a phase relationship between a plurality of longitudinal modes is locked, forming a 2 μm band mode-locked pulse laser, wherein the 2 μm band mode-locked pulse laser oscillates in the ring cavity structure, and the 2 μm band mode-locked pulse laser is transmitted to the pre amplifier by an output end of the fiber coupling output.

4. The broadband laser system enhanced in the later part of the mid infrared spectrum according to claim 3, wherein the pre amplifier comprises a second optical fiber isolator, a first optical fiber combiner, a first 793 nm semiconductor laser, a first single-mode double clad thulium doped fiber, and a third optical fiber isolator, the second optical fiber isolator prevents a subsequent feedback light from returning to the mode-locked fiber laser, the first 793 nm semiconductor laser provides a third pump light, the first optical fiber combiner couples the third pump light and the mode-locked pulse laser into the first single-mode double clad thulium doped fiber, the first single-mode double clad thulium doped fiber provides a gain medium for the mode-locked pulse laser under pump of the third pump light to realize a pre amplification of the power of the mode-locked pulse laser, the pre amplified mode-locked pulse laser enters the optical fiber stretcher through the third optical fiber isolator, the third optical fiber isolator isolates a first feedback light formed by a first subsequent optical path, and the first 793 nm semiconductor laser, the second optical fiber isolator, the first optical fiber combiner, the first single-mode double clad thulium doped fiber, and the third optical fiber isolator are connected by the optical fiber fusion in sequence.

5. The broadband laser system enhanced in the later part of the mid infrared spectrum according to claim 4, wherein the optical fiber stretcher is arranged between the pre amplifier and the amplifier, and the optical fiber stretcher provides positive dispersion to widen a pulse width.

6. The broadband laser system enhanced in the later part of the mid infrared spectrum according to claim 5, wherein the amplifier comprises a second fiber combiner, a second 793 nm semiconductor laser, a second single-mode double clad thulium doped fiber, and a fourth fiber isolator, the second 793 nm semiconductor laser provides a fourth pump light for the second single-mode double clad thulium doped fiber by the second fiber combiner, the fourth fiber isolator isolates a second feedback light formed by a second subsequent optical path, and the second 793 nm semiconductor laser, the second fiber combiner, the second single-mode double clad thulium doped fiber, and the fourth fiber isolator are connected by the optical fiber fusion in sequence.

7. The broadband laser system enhanced in the later part of the mid infrared spectrum according to claim 6, wherein the first nonlinear optical fiber extends the spectrum generated by the main amplifier to the 3.5 μm wavelength band, the first nonlinear optical fiber is a germanate fiber, a fluoride fiber, or a tellurite fiber, and the first nonlinear optical fiber and the mode field adapter are connected by the optical fiber fusion.

8. The broadband laser system enhanced in the later part of the mid infrared spectrum according to claim 7, wherein the mid infrared amplifier comprises a mid infrared fiber combiner, a second fiber laser, and a holmium doped mid infrared gain optical fiber, the mid infrared fiber combiner couples a fifth pump light into the holmium doped mid infrared gain optical fiber by a pump fiber winding or a fiber taper mode, the second fiber laser is the 1125 nm or 1950 nm semiconductor laser, the holmium doped mid infrared gain optical fiber is a holmium fluorozirconate fiber, a holmium fluoroindium fiber, or a holmium fluorotellurite fiber, the holmium doped mid infrared gain optical fiber amplifies the power of the pre amplified mode-locked pulse laser output from the first nonlinear optical fiber by adopt of a holmium ion gain at 3.5 μm, improves the pulse energy of the 3.5 μm later wavelength band, and expands the spectrum to the 4 μm wavelength band, or the mid infrared amplifier comprises the mid infrared fiber combiner, a 1976 nm fiber laser, a 976 nm semiconductor laser, and an erbium doped mid infrared gain fiber, the 1976 nm fiber laser is core pumped, the 976 nm semiconductor laser is cladding pumped, the erbium doped mid infrared gain fiber is an erbium doped fluorozirconate fiber, an erbium-doped indium fluoride fiber, or an erbium-doped fluorotellurite fiber, the erbium doped mid infrared gain fiber amplifies the power of the pre amplified mode-locked pulse laser output from the first nonlinear optical fiber by adopt of a gain of erbium ions at 3.5 μm, improves the pulse energy of the 3.5 μm later wavelength band, and expands the spectrum to the 4 μm wavelength band.

9. The broadband laser system enhanced in the later part of the mid infrared spectrum according to claim 8, wherein the second nonlinear optical fiber is an arsenic sulfide optical fiber or an arsenic selenide optical fiber, extending the spectrum to more than 5 μm wavelength band, the second nonlinear optical fiber and the holmium doped mid infrared gain optical fiber are connected by the optical fiber fusion, and an optical fiber output end of the second nonlinear optical fiber is cut at an angle of 15° to prevent Fresnel reflection.

\* \* \* \* \*